(12) United States Patent
Toyoda et al.

(10) Patent No.: US 8,810,667 B2
(45) Date of Patent: Aug. 19, 2014

(54) IMAGING DEVICE

(75) Inventors: Tetsuya Toyoda, Hachioji (JP); Osamu Nonaka, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 685 days.

(21) Appl. No.: 12/783,874

(22) Filed: May 20, 2010

(65) Prior Publication Data

US 2010/0302428 A1 Dec. 2, 2010

(30) Foreign Application Priority Data

May 26, 2009 (JP) .................................. 2009-126002

(51) Int. Cl.
 *H04N 5/228* (2006.01)

(52) U.S. Cl.
 USPC .................................................... 348/208.99

(58) Field of Classification Search
 USPC ................. 348/333.01, 221.1, 362, 208.99, 348/208.1–208.7
 See application file for complete search history.

(56) References Cited

U.S. PATENT DOCUMENTS

| | | | | |
|---|---|---|---|---|
| 5,648,815 | A * | 7/1997 | Toba | 348/207.99 |
| 6,246,437 | B1 * | 6/2001 | Kaneda | 348/333.03 |
| 7,502,050 | B2 * | 3/2009 | Hatanaka et al. | 348/208.3 |
| 7,565,068 | B2 * | 7/2009 | Endo | 396/52 |
| 7,609,290 | B2 * | 10/2009 | McEwan | 348/36 |
| 7,834,922 | B2 * | 11/2010 | Kurane | 348/294 |
| 8,106,995 | B2 * | 1/2012 | Tamaru | 348/345 |
| 8,134,604 | B2 * | 3/2012 | Fujita et al. | 348/208.6 |
| 2002/0051057 | A1 * | 5/2002 | Yata | 348/142 |
| 2004/0041936 | A1 * | 3/2004 | Uchiyama | 348/335 |
| 2005/0117025 | A1 * | 6/2005 | Ambiru et al. | 348/211.99 |
| 2005/0128312 | A1 * | 6/2005 | Fredlund et al. | 348/222.1 |
| 2006/0044403 | A1 * | 3/2006 | Hatanaka et al. | 348/208.4 |
| 2008/0166117 | A1 * | 7/2008 | Li et al. | 396/121 |
| 2009/0091633 | A1 * | 4/2009 | Tamaru | 348/208.14 |
| 2009/0225182 | A1 * | 9/2009 | Tamura | 348/222.1 |
| 2010/0066860 | A1 * | 3/2010 | Tsurumi | 348/231.2 |
| 2010/0194851 | A1 * | 8/2010 | Pasupaleti et al. | 348/36 |
| 2010/0245602 | A1 * | 9/2010 | Webster et al. | 348/208.4 |
| 2010/0302384 | A1 * | 12/2010 | Sawada | 348/208.4 |
| 2010/0315547 | A1 * | 12/2010 | Takada | 348/416.1 |

FOREIGN PATENT DOCUMENTS

| | | |
|---|---|---|
| JP | 04-249226 | 9/1992 |
| JP | 2001-238177 | 8/2001 |
| JP | 2003-259137 | 9/2003 |
| JP | 2008-054297 | 3/2008 |
| JP | 2010-278486 | 12/2010 |
| WO | WO 2008/018887 | 2/2008 |

OTHER PUBLICATIONS

Office Action for Chinese Patent Application No. 201010189836.2, mailed Jan. 11, 2012 (5 pgs.).
Office Action for Japanese Patent Application No. 2009-126002, mailed Feb. 19, 2013 (2 pgs.).
Office Action for Japanese Patent Application No. 2013-217709, mailed Jun. 5, 2014 (4 pgs.).

* cited by examiner

*Primary Examiner* — Aung S Moe
*Assistant Examiner* — Amy Hsu
(74) *Attorney, Agent, or Firm* — John C. Pokotylo; Straub & Pokotylo

(57) ABSTRACT

An imaging device of the present invention comprises an imaging section for forming a subject image and outputting image data, a movement detection section for detecting movement of the imaging device, a common range determination section for determining a common range, based on detection results from the movement detection section, a display control section for carrying out control so as to achieve appropriate display for image data corresponding to the common range that has been determined by the common range determination section, and a display section for displaying the subject image based on the image data that has been controlled by the display control section.

19 Claims, 14 Drawing Sheets

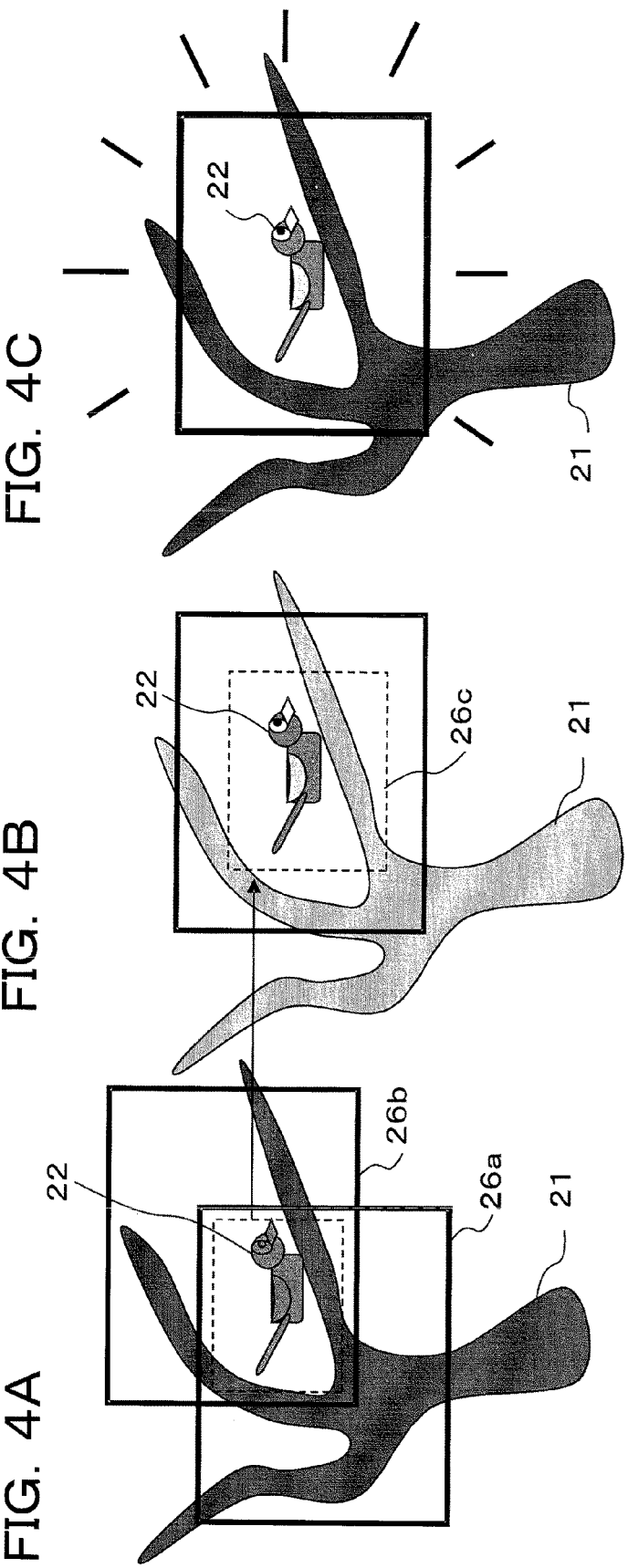

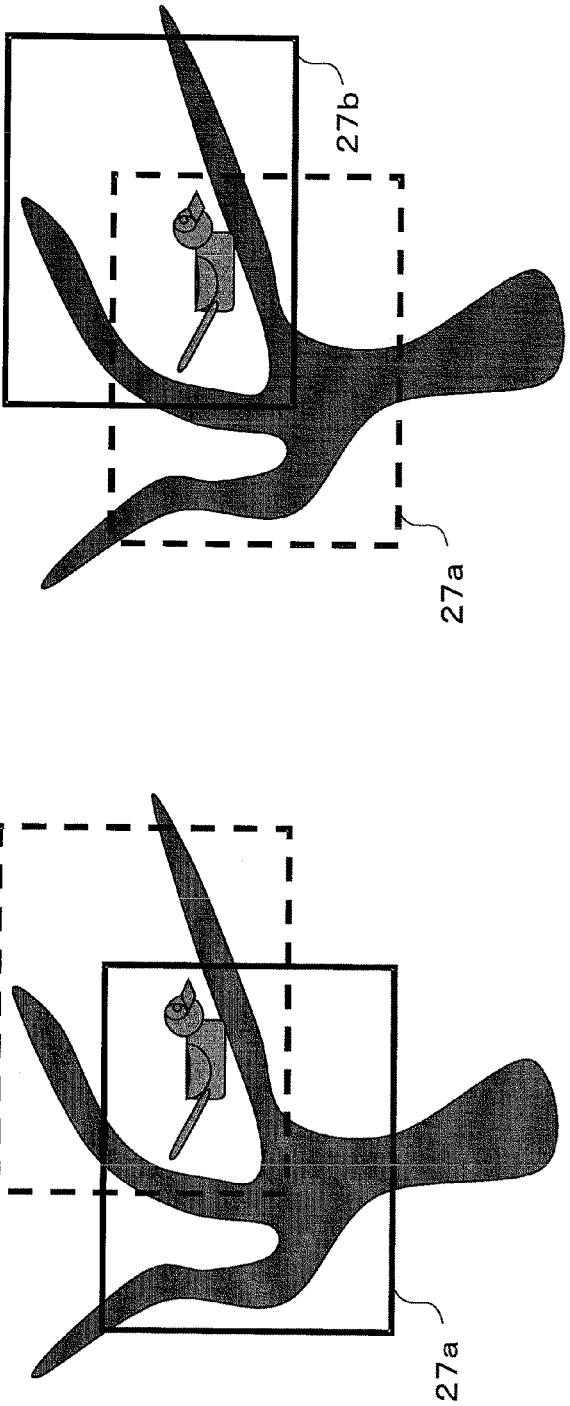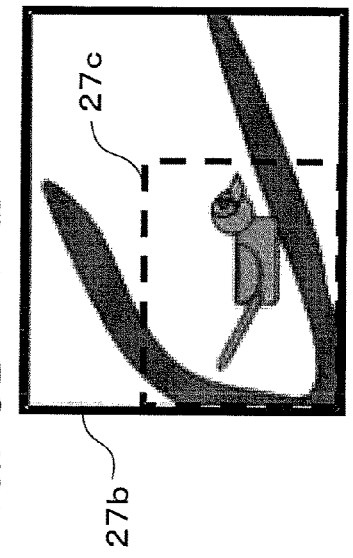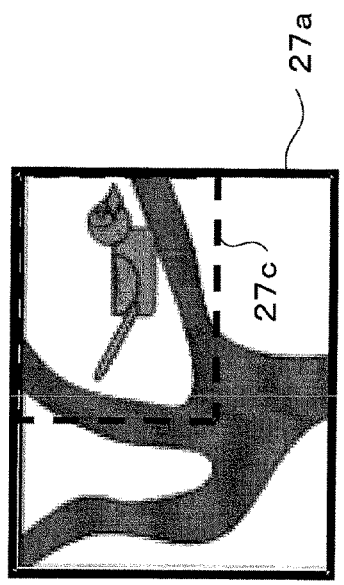
FIG. 6A  FIG. 6B  FIG. 6C  FIG. 6D

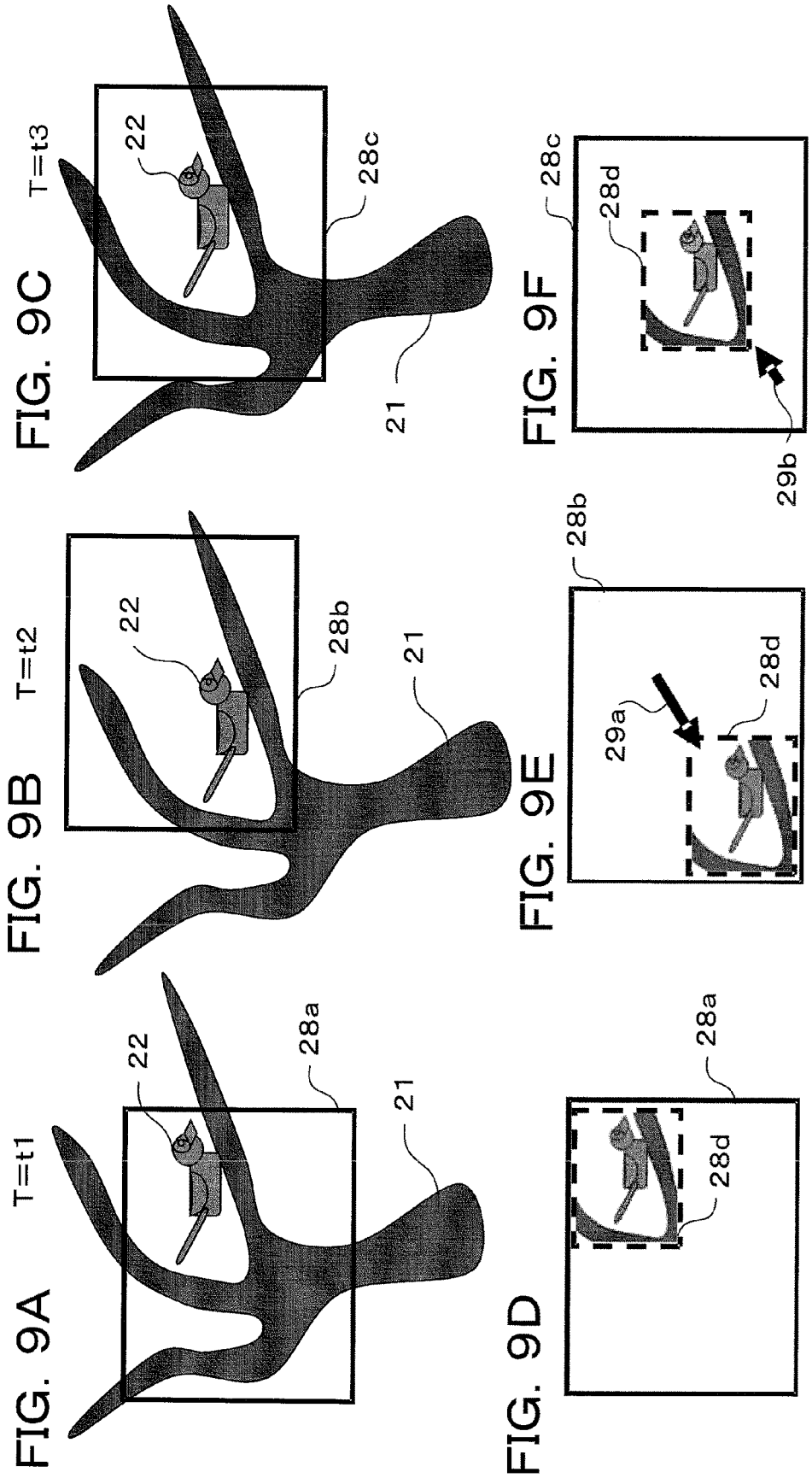

IMAGING DEVICE

Benefit is claimed, under 35 U.S.C. §119, to the filing date of prior Japanese Patent Application No. 2009-126002 filed on May 26, 2009. This application is expressly incorporated herein by reference. The scope of the present invention is not limited to any requirements of the specific embodiments described in the application.

BACKGROUND OF THE INVENTION

1. Field of the Invention

The present invention relates to an imaging device such as a digital camera, video camera or mobile phone with camera, and in detail relates to an imaging device that detects movement of the imaging device and sets an appropriate exposure.

2. Description of the Related Art

There are now more imaging devices being proposed to carryout image processing by analyzing camera information and taken scenes than ever before. For example, Japanese patent laid-open No. 2003-259137 (laid-open Sep. 12, 2003) discloses an image tone correction device that can correct image data using shooting time and specified seasonal information so as to give a tone that matches what the operator intended.

Also, Japanese patent laid-open No. 2001-238177 (laid-open Aug. 31, 2001) discloses an image processing method wherein camera information acquired or input when a subject is taken is acquired, and related information relating to a taken scene is further acquired, as required, and using these items of information a taken scene is estimated and image processing is carried out in accordance with the estimated taken scene. Further, Japanese patent laid-open No. 2008-54297 (laid-open Mar. 6, 2008) discloses an imaging device that determines an image scene when detecting a subject from an image, and controls parameters used at the time of detection in accordance with the determination result.

SUMMARY OF THE INVENTION

The present invention has as its object to provide an imaging device that is capable of detecting a subject that is intended by an operator with a simple configuration, and carrying out display or shooting of the detected subject at an appropriate exposure.

An imaging device of the present invention comprises an imaging section for forming a subject image and outputting image data, a metering range determination section for determining movement of the imaging device based on the image data, and determining a metering range based on the determination for this movement, an image processing section for performing processing on image data so as to give appropriate display, based on image data of a metering range determined by the metering range determination section, and a display section for displaying the subject image based on image data that has been processed by the image processing section.

Also, an imaging device of the present invention comprises an imaging section for forming a subject image and outputting image data, a photometry range determination section for determining movement of the imaging device based on the image data, and determining a photometry range based on the determination result for this movement, an exposure control section for controlling to achieve an appropriate exposure based on image data of a photometry range determined by the photometry range determination section, and a storage section for storing image data that has been controlled to give appropriate exposure by the exposure control section.

Further, an imaging device of the present invention comprises an imaging device of the present invention comprises an imaging section for forming a subject image and outputting image data, a movement detection section for detecting movement of the imaging device, a common range determination section for determining a common range based on detection results by the movement detection section, a display control section for performing control of image data corresponding to the common range that has been determined by the common range determination section so as to achieve appropriate display, and a display section for displaying the subject image based on the image data controlled by the display control section.

Further, an imaging device of the present invention comprises an imaging section for forming a subject image and outputting image data, a movement detection section for detecting movement of the imaging device, a common range determination section for determining a common range based on detection results by the movement detection section, an exposure control section for performing control of image data corresponding to the common range that has been determined by the common range determination section so as to achieve appropriate exposure, and a storage section for storing the image that has been controlled by the display control section so as to achieve appropriate exposure.

Further, an imaging device of the present invention comprises an imaging section for forming a subject image, and a display control section for adjusting image processing amount for the result of imaging and displaying on a display section, wherein the display control section changes the image processing amount in accordance with image characteristics obtained from images sequentially obtained by the imaging section.

BRIEF DESCRIPTION OF THE DRAWINGS

FIG. 4A to 4C are drawings for explaining how partial exposure metering is carried out in order to obtain appropriate exposure for a subject, in the camera of the first embodiment of the present invention.

FIG. 6A to 6D are drawings for explaining a range in which partial exposure metering is carried out from movement of an image, in the camera of the first embodiment of the present invention.

FIG. 9A to 9F are drawings for explaining how partial exposure metering is carried out to obtain appropriate exposure for a subject, with a camera of a second embodiment of the present invention.

DETAILED DESCRIPTION OF THE PREFERRED EMBODIMENTS

Figure 1:
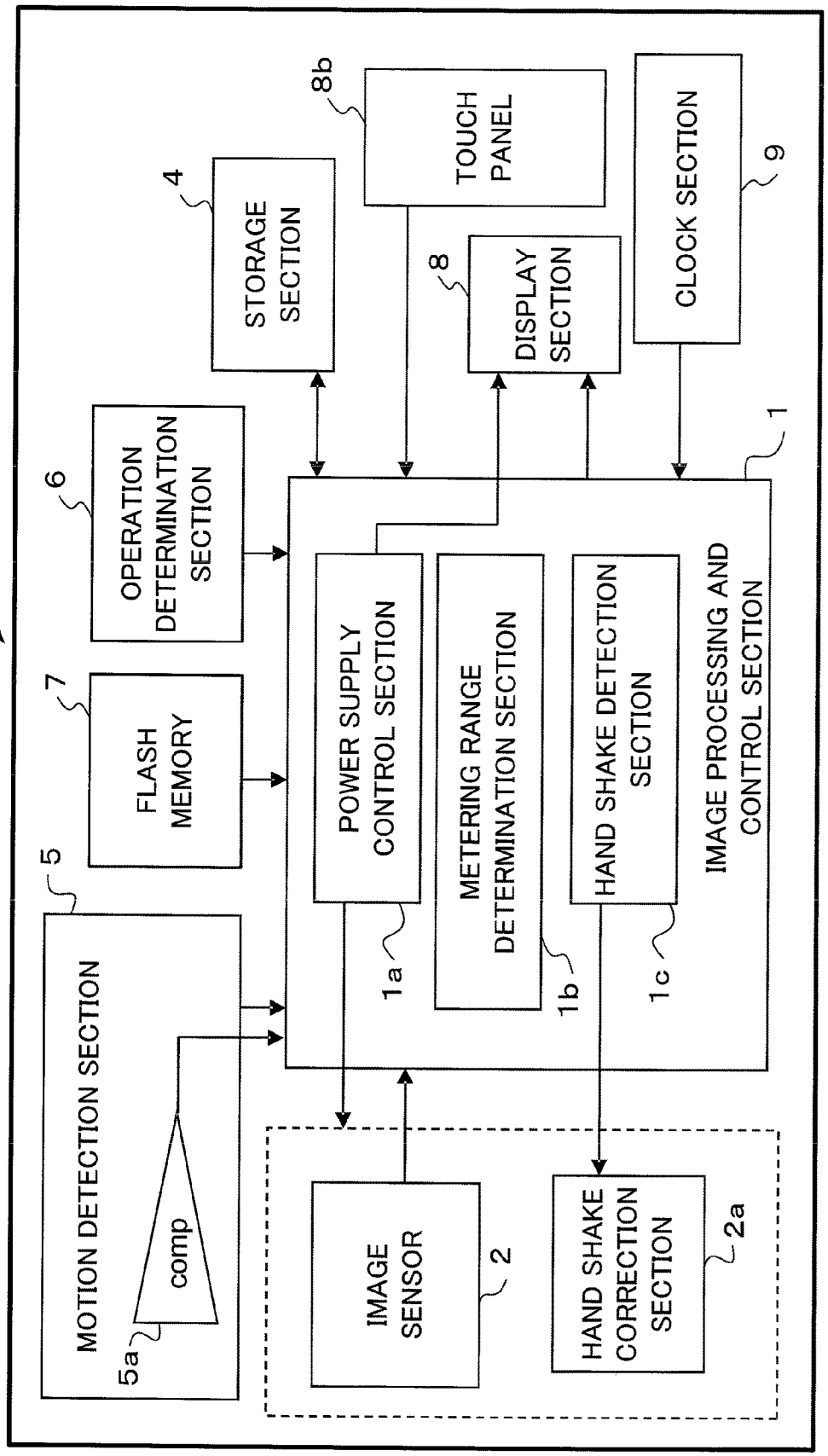
FIG. 1 is a block diagram showing the structure of a camera relating to a first embodiment of the present invention.

Preferred embodiments using a camera to which the present invention has been applied will be described in the following in accordance with the drawings. FIG. 1 is a block diagram showing electrical circuits of a camera 10 of a first embodiment of the present invention. The camera 10 is a digital camera, and comprises an image processing and control section 1, an imaging section 2, a hand shake correction section 2a, a storage section 4, a motion detection section 5, an operation determination section 6, a flash memory 7, a display section 8, a touch panel 8b and a clock section 9, etc.

The imaging section 2 includes exposure control portions, such as a photographing lens having a zoom function and a shutter, an image sensor, and image sensor drive and readout circuits, etc., and converts a subject image that has been formed by the photographing lens to image data using the image sensor, and outputs this image data. The handshake correction section 2a drives the image sensor or the photographing lens within the imaging section 2 in accordance with a hand shake signal from a hand shake detection section 1c, that will be described later, so as to remove hand shake.

The image processing and control section 1 controls all sequences of the camera 10, in accordance with programs stored in the flash memory 7. Various image processing, such as acquiring image signals output from the imaging section 2, thinning processing, edge enhancement, color correction, image compression etc. are also carried out, and image processing such as live view display, storage to the storage section 4, and playback display are carried out. Also, image processing is carried out to extract a part of the image data and perform appropriate display and appropriate exposure of this part. The image processing and control section 1 also functions as an exposure control section for performing control to achieve appropriate exposure based on image data in a metering range that has been determined by a metering range determination section 1b, that will be described later. A power supply control section 1a, metering range determination section 1b and hand shake detection section 1c are included in the image processing and control section 1.

The power supply control section performs overall power supply control for the camera 10. When it has been determined by an operation determination section 6, which will be described later, that a power switch has been turned on, power for the camera 10 is turned on, and the camera 10 is activated. Besides this way of activating the camera, power is also turned on and the camera activated when a large vibration, such when suddenly picking up the camera 10, is detected by a comparator 5a inside the motion detection section 5 that will be described later. In this manner, shooting is made possible by the photographer simply picking up the camera 10.

The metering range determination section 1b determines a range in which metering is carried out so as to achieve appropriate exposure when performing exposure control at the time of exposure or live view display. In determining this metering range, camera movement is detected based on image data output from the imaging section 2, and based on this movement a position of the photographer's intended subject is estimated, and determined as a metering range.

The hand shake detection section 1c detects movement such as hand shake that is applied to the camera 10, on the basis of image data output from the imaging section 2, and generates hand shake correction signals in order to negate movement such as this hand shake. As previously described, the hand shake correction signals are output to the hand shake correction section 2a, where hand shake correction is carried out.

The motion detection section 5 has sensors such as an acceleration sensor, angular acceleration sensor, angular velocity sensor, and a gyro, and outputs movement signals corresponding to movement applied to the camera, and a gravitational direction signal representing the direction of gravitational force, to the image processing and control section 1. The motion detection section 5 also has a comparator 5a for comparing movement signals output from the above-described sensors with specified values.

The comparator 5a also operates while power to the camera 10 is turned off, and if there is movement of more than a specified value an activation signal is output from the comparator 5a. The power supply control circuit 1a sets the camera 10 to a power on state, as described previously, and activates the camera 10 if an activation signal is received from the comparator 5a.

The operation determination section 6 contains various operation members, such as a release button, power switch, playback mode setting button, menu button, etc., and determines operating states of these operation members and sends determination results to the image processing and control section 1. The image processing and control section 1 carries out control for shooting and playback in a specified sequence, in accordance with the operating states of the operation members. The flash memory 7, which is a non-volatile memory capable of being electrically rewritten, stores programs that are executed by the image processing and control section 1, and stores various data such as adjustment data.

The storage section 4 stores image data that has been acquired by the imaging section 2 when shooting is instructed by a release button, and that has been subjected to image processing by the image processing and control section 1. Also, shooting time and date information output from a clock section 9, that will be described later, and shooting location information output from a GPS or the like, not shown, are correlated to image data and stored. This shooting location information and shooting date information can be used at the time of image processing and image search.

The display section 8 has a display section such as a liquid crystal panel or an organic EL panel arranged on a rear surface of the camera 10, and carries out live view display prior to shooting, normal playback display of already stored images, and display of camera information, etc. A touch panel 8b is arranged on a front surface of the display panel of the display section 8, or inside the display panel, and detects a position touched the photographer's finger etc. and outputs the detection result to the image processing and control section 1. The clock section 9 has a calendar function and a clock function, and outputs shooting date and time information at the time of shooting.

Figure 2A:
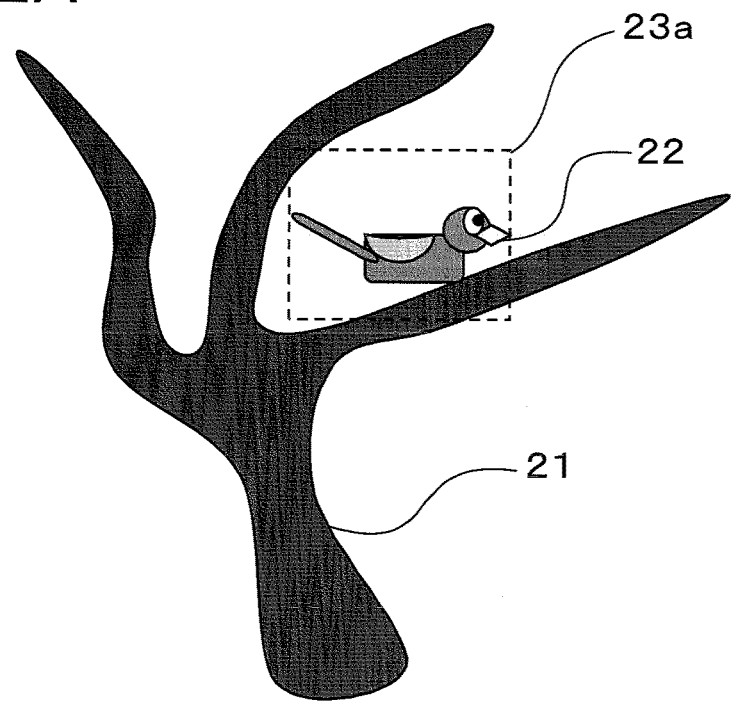
FIG. 2A and FIG. 2B are drawings showing a relationship between subject and screen angle, in the camera of the first embodiment of the present invention.
Figure 2B:
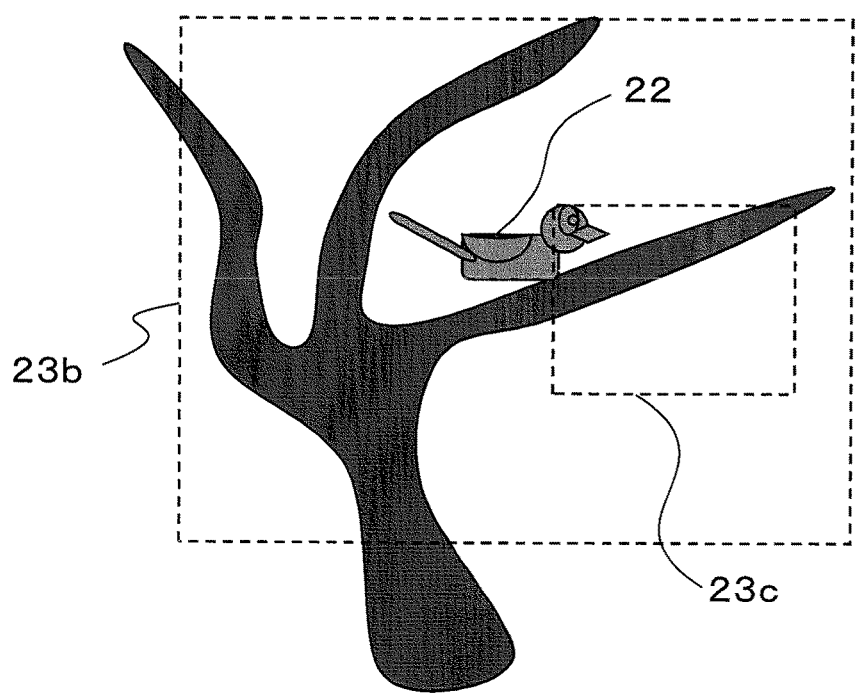

Next, the general concept of the display control and exposure control in this embodiment will be described using FIG. 2A to FIG. 4C. FIG. 2A and 2B show appearance when a photograph of a small bird 22, being a subject, is taken. The small bird 22 is only an example, and this embodiment assumes a small subject, such as a small bird or a cherry blossom. In the state shown in FIG. 2A, the photographer is trying to photograph the small bird 22, and so only a narrow highlighted field of view is being watched.

In this case, the human eye can faithfully recognize the color of the highlighted range 23a, but since in live view display on the display section 8 of the camera 10 display control is carried out in accordance with the brightness of the entire screen, it is not possible to faithfully replicate the colors of the small bird 22. In particular, in a case where sky is the background, exposure is affected by the sky having a wide area, and results in a display where the small bird 22 is dark and it is not possible to discern where it is.

Also, the highlighted field of view 23a not matching a wide angle field of view 23b of the camera 10 or a desired field of view 23c is also a cause of confusion to photographers. Specifically, in a case where a small bird 22, being the subject can not be found on the display section 8, then the photographer zooms the imaging section 2 toward the wide angle end, as shown in FIG. 2B, but with the wide angle field of view 23b it is difficult to see the small bird 22 as the color is close to achromatic. If the photographer then zooms to the desired field of view 23c the small bird 22 will be moved out of the field of view with only slight shaking of the camera 10.

With a conventional camera 10, therefore, it is difficult to get the small bird 22 that is the objective inside the angle of view of the camera 10 while monitoring the display section 8, and the small bird 22 will often fly off while changing the angle of view or changing the viewing direction.

Figure 3A:
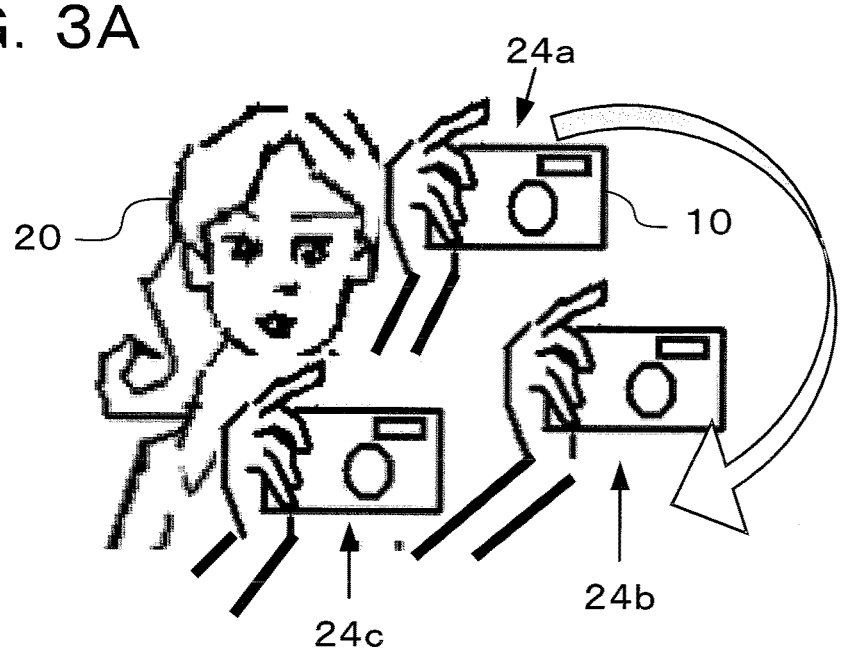
FIG. 3A and FIG. 3B are drawings showing appearance when searching for a subject image with the digital camera of the first embodiment of the present invention.

In this embodiment, when the photographer searches for the small bird 22 that is the subject, as shown in FIG. 3A, the camera 10 is moved though position 24a, position 24b and position 24c, and so movement of the camera 10 at this time is detected to determine a metering range at the time of display and exposure. Specifically, a metering range is determined utilizing the fact that field of view ranges 25a, 25b and 25c change in accordance with positions 24a, 24b and 24c (not only simply position, but also including direction in which the subject is facing) of the camera 10.

When the viewing angle of the camera 10 is wide, the small bird 22 is small and it is difficult to know its current location, but there is a high possibility of the small bird 22 being located within a range where the photographer moves the camera in search of it. Consequently, a common range 25d where the field of view ranges 25a to 25c are overlapping is considered to be a portion where the photographer 20 is prioritizing their search for the subject, and exposure is obtained in this portion.

At the time when the camera 10 starts to move, exposure has not been obtained for the small bird 22, and so the colors are not the same as when looking at the small bird 22 with the naked eye. The photographer is therefore unable to correctly perceive the position of the small bird 22. However, if the camera 10 obtains exposure in the common range 25d where the ranges 25a to 25c overlap, exposure is obtained for the small bird 22, and the colors of the small bird can be seen precisely. The photographer 20 can therefore correctly carry out framing and zooming.

Figure 3B:
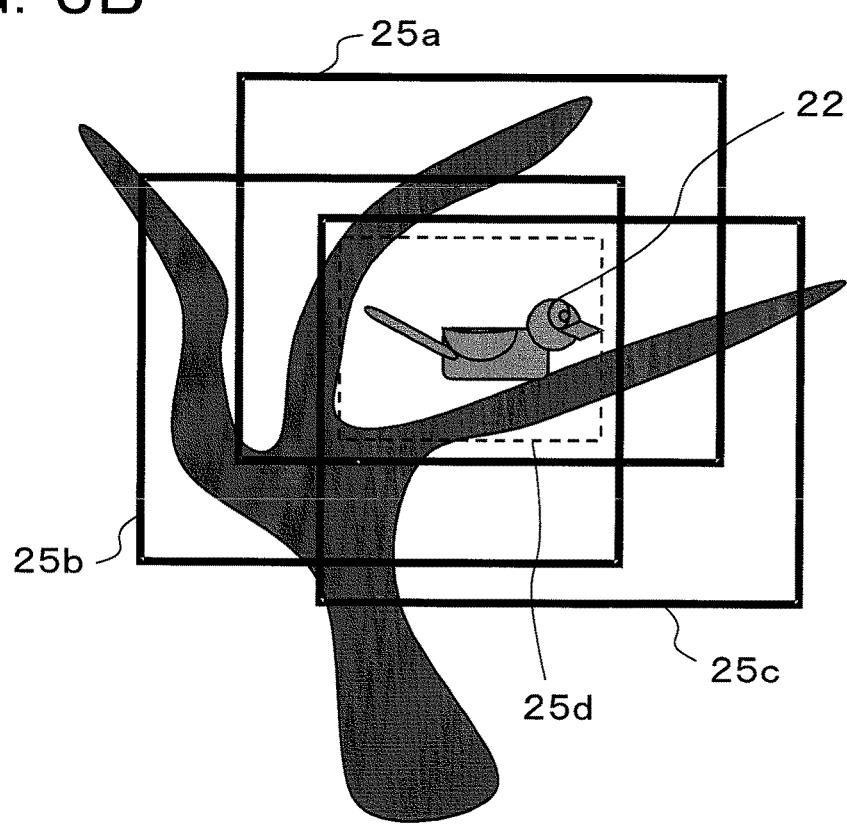
Figure 5:
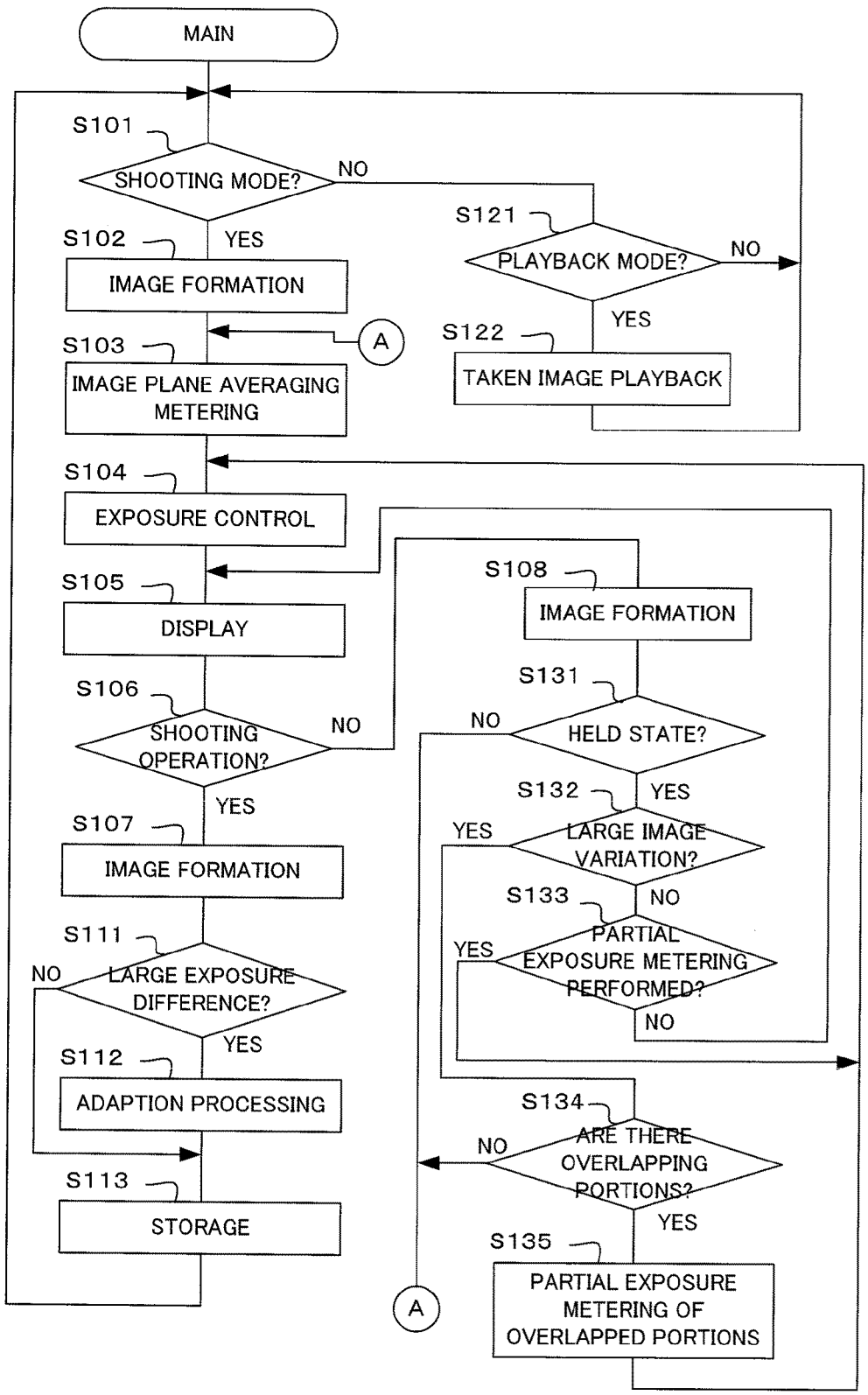
FIG. 5 is a flowchart showing operation of the camera of the first embodiment of the present invention.

As shown in FIG. 3B, it is possible to obtain the common range 25d from a number of ranges 25a to 25c, but in the flow of FIG. 5 a common range 26c is determined using two ranges 26a and 26b, as shown in FIG. 4A. If the camera 10 is pointed towards the field of view ranges 26a and 25b in searching for the small bird 22, then since the photographer considers that the subject is in the direction of this common range 26c exposure control is prioritized to that portion.

By carrying out exposure control so as to give appropriate exposure for the common range 26c, as shown in FIG. 4B, it is possible to perform control that stresses exposure and color reproducibility of the part of the small bird 22. Following that, in the case of partial exposure metering, color correction is also carried out as well as exposure. In the case of carrying out live view display, exposure control is carried out using ISO sensitivity and an electronic shutter of an image sensor etc., and with exposure control in the case of storing in the storage section 4 control is carried out using ISO sensitivity, aperture value, shutter speed etc.

Also, in recent years image composition methods have become known in which a natural appearance is achieved while carrying out display and exposure separately for a portion that is inside an image and another portion. By using this type of technology, it is also possible to acquire an image that includes a tree 21 and is not over exposed overall, as shown in FIG. 4C, while still giving appropriate color reproducibility for the small bird 22, as shown in FIG. 4B. This processing is executed in step S112 of the flowchart shown in FIG. 5, which will be described later.

In this way, in this embodiment, the fact that the photographer searches for a subject, such as the small bird 22, by trial and error by moving the camera 10 when framing is utilized to display and expose the subject with an appropriate exposure.

Next, operation of the camera 10 of this embodiment will be described using the flowchart shown in FIG. 5. This flowchart and a flowchart to be described later are executed by the image processing section and the control section 1, in accordance with programs stored in the flash memory 7. If the power to the camera 10 is turned on and the camera activated, the processing flow shown in FIG. 5 commences. As well as when the power switch is turned on, power on is also started when an activation signal is output from the comparator 5a of the motion detection section 5, as described previously.

If the processing flow shown in FIG. 5 starts, it is first determined whether or not the camera is in shooting mode (S101). A shooting mode and a playback mode are provided in this camera 10, and the photographer's mode selection state is determined by the operation determination section 6. If the result of determination in step S101 is that the camera is not in shooting mode, it is next determined whether or not it is in playback mode (S121).

If the result of determination in step S121 is that the camera 10 is not in playback mode either, processing returns to step S101. On the other hand, if playback mode is determined playback of taken images is carried out (S122). In this step, images selected by the user from among taken images stored in the storage section are playback displayed on the display section 8. Once playback of taken images is finished, processing returns to step S101.

If the result of determination in step S101 is that it is shooting mode, then in step S102 and after control is carried out so as to give appropriate display and exposure, focusing on the common range 25d that was explained using FIG. 2A to FIG. 4C. First of all, image forming is carried out (S102). In this step image data of a subject image is acquired by the imaging section 2. Image plane averaging metering is then carried out (S103). In this step, an average value of the image data acquired in step S102 is calculated by the image processing and control section 1.

Once image plane averaging metering has been carried out in step S103, exposure control is next carried out (S104). In the subsequent step S105, live view display is carried out based on the image data, but in this step S104 control such as for ISO sensitivity for the imaging section 2 is carried out based on subject brightness obtained by image plane averaging metering. Next, live view display is carried out in the display section 8 based on image data that has been subjected to exposure control (S105). By carrying out live view display it is possible for the photographer to perform framing.

Once the display in step S105 has been carried out, it is next determined whether or not a shooting operation has been performed. In this step, whether or not the photographer has operated a release button to issue an exposure command is determined by the operation determination section 6.

If the result of determination in step S106 is that a shooting operation has not been performed, image forming is next carried out, similarly to step S102 (S108). In the case where display control is being carried out based on the result of image plane averaging metering in step S103, then appropriate display is unlikely for a partial subject (for example the small bird 22), as shown in FIG. 4A. At this time, since the photographer moves the camera 10 so as to search for the subject, in step S131 and after it is determined whether or not this type of movement is being performed, and if the result of determination is that a subject is being searched for, display control is carried with emphasis on the common range 26c, as was described using FIG. 4B.

Once image formation in step S108 has been carried out, it is next determined whether or not the camera 10 is being held (S131). In this step, it is determined whether or not the photographer 20 is holding the camera 10 as shown in FIG. 3A. This determination is carried out, for example, by determination as to whether or not a touch panel 8b has been touched at a specified location (location where it is possible to grip the camera 10 firmly with the right hand), and/or by detecting whether the direction of gravitational force on the camera 10 is in the vertical or horizontal direction using the motion detection section 5.

If the result of determination in step S131 is that the camera is not being held, processing returns to step S103 where image plane averaging metering is carried out, and live view display is continued. On the other hand, if the result of determination is that the camera 10 is being held, it is next determined whether or not image variation is large (S132). In this step, it is determined, based on image data from the imaging section 2, whether or not variation in images is large, in other words, whether or not the photographer is moving the camera 10 to acquire the subject. This determination of image variation is carried out by comparing an image of an observation range 27a at time T=t1 shown in FIG. 6A with an observation range 27b at time T=t2 shown in FIG. 6B, and determining whether or not the result of this comparison, or a variation in the observation ranges, is larger than a predetermined value.

If the result of determination in step S132 is that the image variation is large, it is next determined whether or not there are overlapping portions (S134). In this step, it is determined whether or not there is a common range 27c, as shown in FIG. 6C and FIG. 6D. If the result of this determination is that there are no overlapping portions, it is simply considered that the taken image has changed, and processing returns to step S103 where averaging metering is carried out.

On the other hand, if the result of determination in step S134 is that there are overlapping portions, partial exposure metering is carried out for the overlapping portions (S135). Here, a brightness value for partial exposure metering is obtained using image data for portions corresponding to the common portion 27 shown in FIG. 6C and FIG. 6D. Once a partial exposure metering value has been obtained, processing returns to step S104. Detailed description of this partial exposure metering for the overlapped portions will be given later using FIG. 7 and FIG. 8A to FIG. 8C.

In the case where the determinations in both step S132 and step S134 are yes, and the partial exposure metering of step S135 is carried out, it is a case of the two images of observation ranges 27a and 27b shown in FIG. 6A and FIG. 6B not matching, and there being the common range 27c shown in FIG. 6C and FIG. 6D. With this embodiment, when the area of the common portion is smaller than ½ the screen, and larger than ¹⁄₁₆th of the screen, with image variation it is determined that there is an important portion. These numerical values are examples, and can be set as appropriate, but numerical values are preferably determined taking into consideration correction of composition after AE lock in step S133, which will be described later, and determination of whether or not there is movement for subject searching etc.

If the result of determination in step S132 is that image variation is not large, it is next determined whether or not partial exposure metering has already been completed (S133). This is a determination as to whether or not partial exposure metering of step S135 was carried out. If the result of determination is that this partial exposure meeting has not been carried out, processing returns to step S105, while if partial exposure metering has been carried out processing returns to step S104. Specifically, after partial exposure metering has been carried out in step S135, if it has been determined in step S132 that image variation is small (No in step S132) then it is considered that a subject (small bird 22) was found, and an AE lock state is entered.

In this way, in the case where it has been determined in step S106 that a shooting operation (release operation) has not been performed, display control for live view display is carried out so as to give appropriate display for a small subject, such as the small bird 22, by executing step S108 and steps S131 to S135. In the event that there is not a small subject such as the small bird 22, there is no movement in searching the subject, even if the camera is being held, and so averaging metering takes place, but since this time the subject is large appropriate exposure is achieved.

If the result of determination in step S106 is that there has been a shooting operation (release operation), shooting is carried out (S107). In this step, image data from the imaging section 2 is acquired in response to the release operation, for image data storage. Next, it is determined whether or not a difference in exposure is large (S111). Here, it is determined whether or not a difference between maximum brightness and minimum brightness within the picture is greater than a specified value.

If the result of determination in step S111 is that the exposure difference is large, adaption processing is carried out (S112). Adaption processing means carrying out image processing to give appropriate exposure for the subject (small bird 22), while also giving appropriate exposure overall, such as for a tree 21 or the like that is overexposed, as has been described using FIG. 4B and FIG. 4C. The specified value for the determination in step S111 is set to a brightness difference at which it is desired to carry out adaption processing.

Once the adaption processing of step S112 is carried out, or if the result of determination in step S111 is that exposure difference is not large, the image data acquired in step S107 and the image data that was subjected to adaption processing in step S112 are stored in the storage section 4 (S113). At the time of image data storage, shooting date and time information etc. correlated with the image data is stored. Once image data storage is finished, processing returns to step S101.

Figure 7:
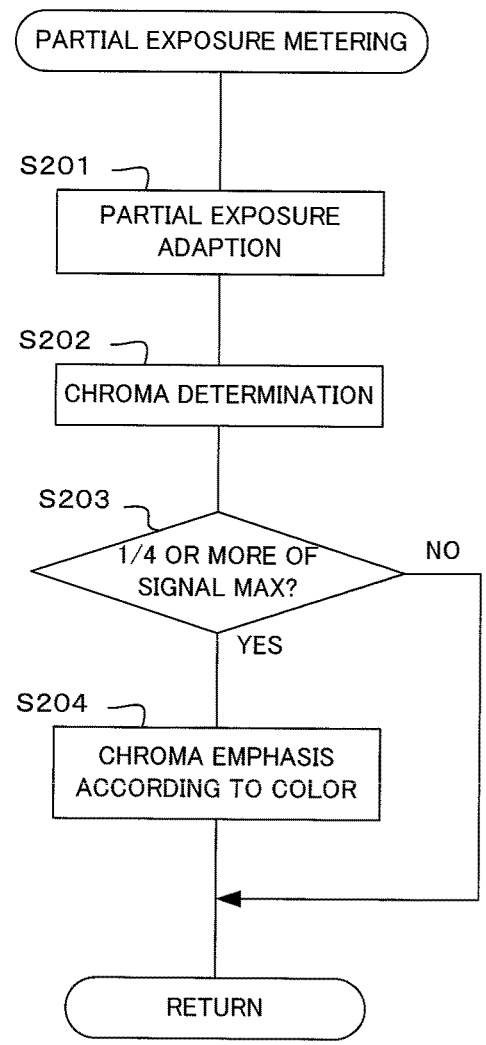
FIG. 7 is a flowchart showing operation of partial exposure metering for the camera of the first embodiment of the present invention.

Next, detailed operation of partial exposure metering in step S135 will be described using FIG. 7 and FIG. 8. When a subject is under exposed, differences in the RGB three color signal outputs are small, and there will be cases where color discrimination is difficult. With this embodiment therefore, when the camera 10 is being moved, as with the common range 26c of FIG. 4A and FIG. 4B, and the common range 27c of FIG. 6C and FIG. 6D, partial exposure metering is carried out for a portion that is common within that movement.

Figure 8A:
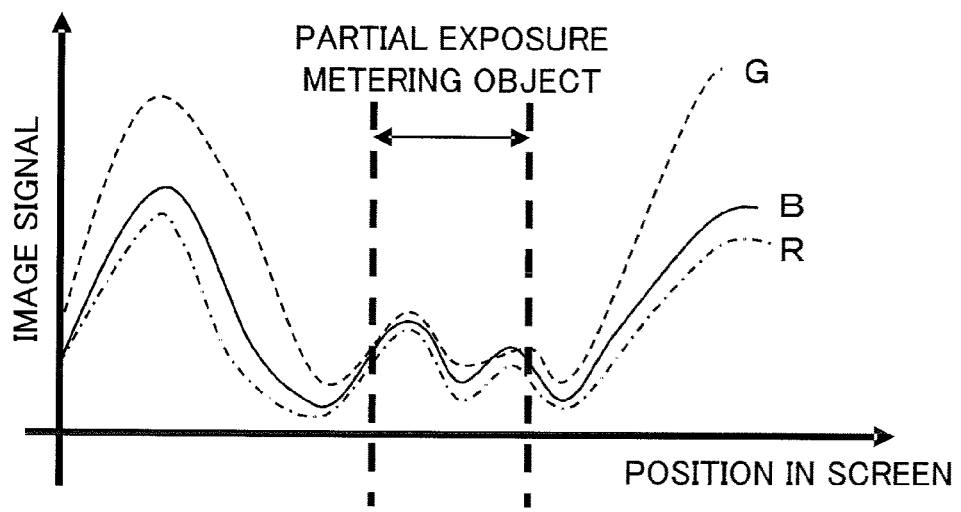
FIG. 8A to FIG. 8C are graphs showing signal processing in the case of carrying out partial exposure metering, in the camera of the first embodiment of the present invention.
Figure 8B:
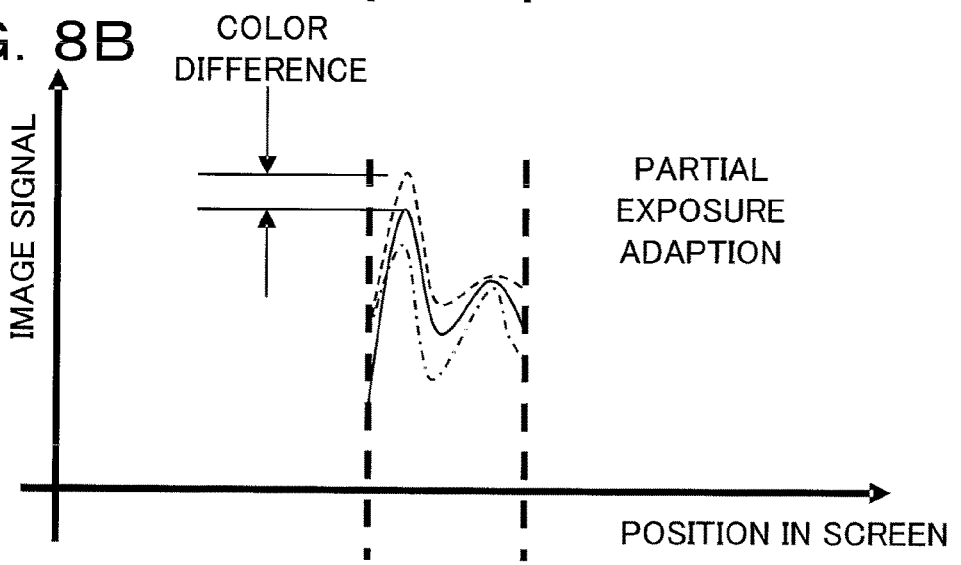

Once the partial exposure metering subroutine is entered, proper adjustment of a partial exposure is first carried out (S201). Here, within respective color signal outputs (image data) for R (red), G (green) and B (blue) for positions within the picture, as shown in FIG. 8A, respective color signals for a range that is the subject of partial exposure metering are controlled to an appropriate level, as shown in FIG. 8B. In the case of display, exposure is set to an appropriate level by varying ISO sensitivity or the like, and/or varying gain for image data in the image processing and control section 1. In the case of performing a shooting operation, appropriate exposure is achieved by also carrying out control of shutter and aperture etc.

The partial exposure metering of step S201 alone is sufficient, but under backlit conditions there may be situations where it is difficult to discern colors due to peripheral light to the display section 8 and photographic flare. With this embodiment therefore, after correct adjustment of partial exposure has been carried out in step S201, chroma emphasis is carried out in step S202 and after.

Then, once correct adjustment of partial exposure has been carried out, chroma determination is carried out (S202), and it is determined whether or not there is a difference of greater than or equal to ¼ signal Max (S203). In these two steps, a difference signal between G and B, and a difference signal between B and R are obtained (refer to FIG. 8B), and it is determined whether or not either of these differences is ¼ or more of the maximum value of the RGB signals. In the case of a subject that is approaching an achromatic color, if chroma emphasis processing is forcibly carried out it will result in an unnatural tint, which is why chroma emphasis processing is carried out in cases where there is a chroma difference of a certain level. ¼ is merely an example, and can be made a numerical value at which it can be determined whether or not a difference in chroma is of such a level that it will not be unnatural when chroma emphasis is carried out.

Figure 8C:
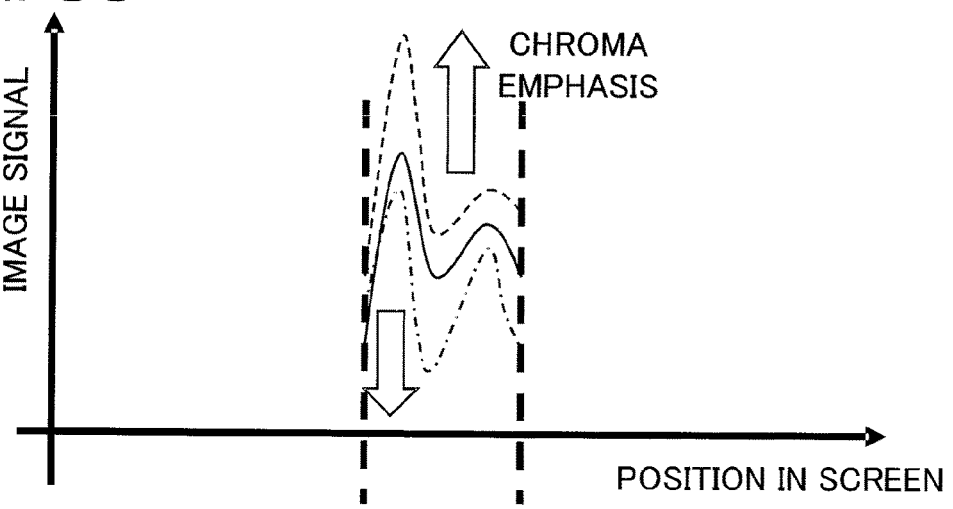

If the result of determination in step S203 is that the difference is ¼ or greater, chroma emphasis is carried out according to color (S204). As chroma enhancement, image processing is carried out to make signal differences between G and both R and B larger, as shown in FIG. 8C. As this processing, the difference is made 1.3 times larger for R and 1.7 times larger for B, for example. Once the chroma enhancement has been carried out in step S204, or if the result of determination in step S203 was greater than or equal to ¼ signal Max, processing returns to the originating flow.

In this way, in the processing flow for partial exposure metering of this embodiment, using image data, being the common ranges 26c and 27c with movement of the camera 10, partial exposure metering values are obtained and live view display on the display section 8 is carried out at an appropriate exposure. It is therefore possible to perform display with an appropriate exposure, even with a small subject such as the small bird 22. Also, when a release operation has been carried out exposure control is performed based on partial exposure metering values, and so image data is acquired at the appropriate exposure, and this image data can be stored in the storage section 4.

Also, in the processing flow for partial exposure metering of this embodiment, chroma emphasis is carried out when there is a difference in chroma of a particular extent. This is because even if coloring is indistinct, such as in backlit conditions, it becomes easier to see colors inherent to the subject, and framing and zooming become easier to perform.

As has been described above, with the first embodiment of the present invention movement of the camera 10 is detected based on image data, and partial exposure metering is carried out based on this detected movement of the camera 10. The photographer's intended subject is therefore detected, and it is possible to perform appropriate display or appropriate exposure of this subject.

Next, a second embodiment of the present invention will be described using FIG. 9A to FIG. 9F, and FIG. 10. In the first embodiment, it is determined whether or not there is a common range when the camera 10 is moving. In the second embodiment, a movement vector is detected, and when this movement vector is reversed, and when there is a common range, partial exposure metering is carried out for that range.

Detection of the common range in the second embodiment will be described using FIG. 9A to FIG. 9F. FIG. 9A shows a relationship between subjects (a tree 21 and a small bird 22) and a viewing range 28a at time T=t1. FIG. 9B shows a relationship between the subjects and the viewing range at time T=t2. Here, the viewing range moves as a result of the photographer moving the camera 10 in search of the small bird 22. A movement vector 29a at this time is obtained using image data for the viewing range 28a and the viewing range 28b.

Next, at time T=t3, as shown in FIG. 9C, the viewing range 28c moves, and a movement vector 29b at this time is obtained using image data for the viewing range 28b and the viewing range 28c. The movement vector 29b obtained here and the movement vector 29a obtained at time T=t2 are compared, and it is determined whether the direction of the vectors has reversed. If the result of determination is that the direction has reversed, it is considered that there is a common range close to the point in time where that reversal occurred, and the common range is obtained and subjected to partial exposure metering.

In the second embodiment, a common range is obtained in the manner as described previously, but this configuration is the same as the first embodiment, and since the flow chart shown in FIG. 5 is simply replaced with the flowchart shown in FIG. 10, description will be given focusing on points of difference.

Figure 10:
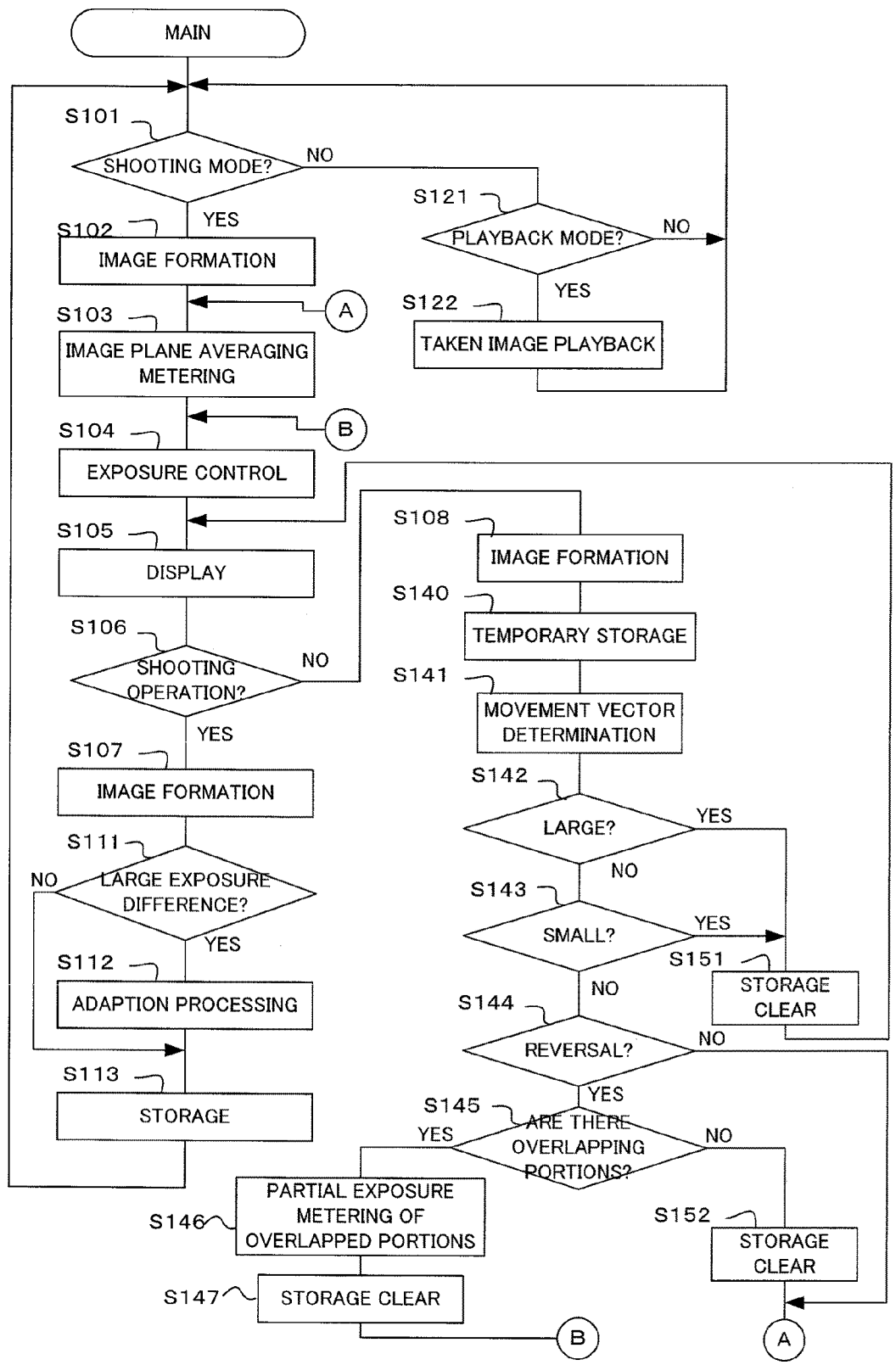
FIG. 10 is a flowchart showing operation of the camera of the second embodiment of the present invention.

Within the processing flow shown in FIG. 10, steps S101 to S122 are the same as the processing flow shown in FIG. 5, and so the same steps have the same step numbers attached thereto, and detailed description is omitted. In step S106, it is determined whether or not a shooting operation has been carried out, and if the result of determination is that a shooting operation has not been carried out imaging is carried out in step S108. Image data acquired by this imaging is temporarily stored (S140). Every time processing passes through this step S140, image data is sequentially temporarily stored, and cleared in steps S151, S152 and S147 which will be described later.

Once image data has been stored, movement vector determination is carried out (S141). Here, a movement vector is obtained using the newest image data that has been temporarily stored in step S140 and the image data temporarily stored one before. Once movement vector determination has been carried out, it is then determined whether or not the movement vector that was obtained in step S141 is larger than a first specified value (S142). If the result of this determination is that the movement vector is not larger than the first specified value, it is next determined whether or not the movement vector obtained in step S141 is smaller than a second specified value (S143).

If the results of determination in steps S142 and S143 are that the movement vector is larger than the first specified value or smaller than the second specified value, the image data that was temporarily stored in step S140 is cleared (S151), and processing returns to step S105. On the other hand, if the result of determination in step S143 is that the movement vector is not smaller than the second specified value, it is then determined whether or not the movement vector has been reversed (S144).

When determining reversal of the movement vector, when movement vectors are so large that detection is not possible in consecutive frames (Yes in S142) it is considered that framing is being performed, and when the movement vector is 1/10th or less of the screen in consecutive frames (Yes in S143) it is considered to be a state where the photographer is trying to determine the composition, and the image data that was temporarily stored in step S143 is cleared. Accordingly, the determination as to whether or not the movement vector has reversed, in step S144, is a case where the movement vector is not too large and is not too small. This time is made a state where the photographer is still searching for the subject, and it is being determined whether or not the movement vector has been reversed. The first and second specified values in steps S142 and S143 can be appropriately set taking into consideration whether the above described framing is in progress, or composition is being decided, etc.

If the result of determination in step S144 is that the movement vector has not reversed, processing returns to step S103. On the other hand, if the result of determination is that the movement vector has reversed, it is then determined whether or not there are overlapping portions (S145). Here, image data that was temporarily stored in step S140 and image data at the time of movement vector determination in step S141 are compared, to determine whether or not there are image portions that are common.

If the result of determination in step S145 is that there are no overlapping portions, the image data that was temporarily stored in step S140 is cleared (S152), and processing returns to step S103. On the other hand, if the result of determination is that there are overlapping portions, partial exposure metering is carried out for the overlapping portions (S146). This partial exposure metering is the same as the partial exposure metering that was described in FIG. 7 and FIG. 8 for the first embodiment, and so detailed description is omitted. Once partial exposure metering has been carried out, the image data that was temporarily stored in step S140 is cleared (S147), and processing returns to step S104.

Since there is a limit to the temporary storage of imaging results in step S108, this date is cleared as required (steps S151, S152, S147). When there is an operation other than a shooting operation, such as zooming or the release switch being pressed down half way, it is possible to perform locking of exposure.

As has been described above, with the second embodiment also, movement of the camera 10 is detected based on image data, and partial exposure metering is carried out based on this detected movement of the camera 10. The photographer's intended subject is therefore detected, and it is possible to perform appropriate display or appropriate exposure of this subject. Also, with the second embodiment determination as to whether or not there are overlapping portions is only attempted when the movement vector has been reversed, and so it is possible to shorten the processing time.

Figure 11:
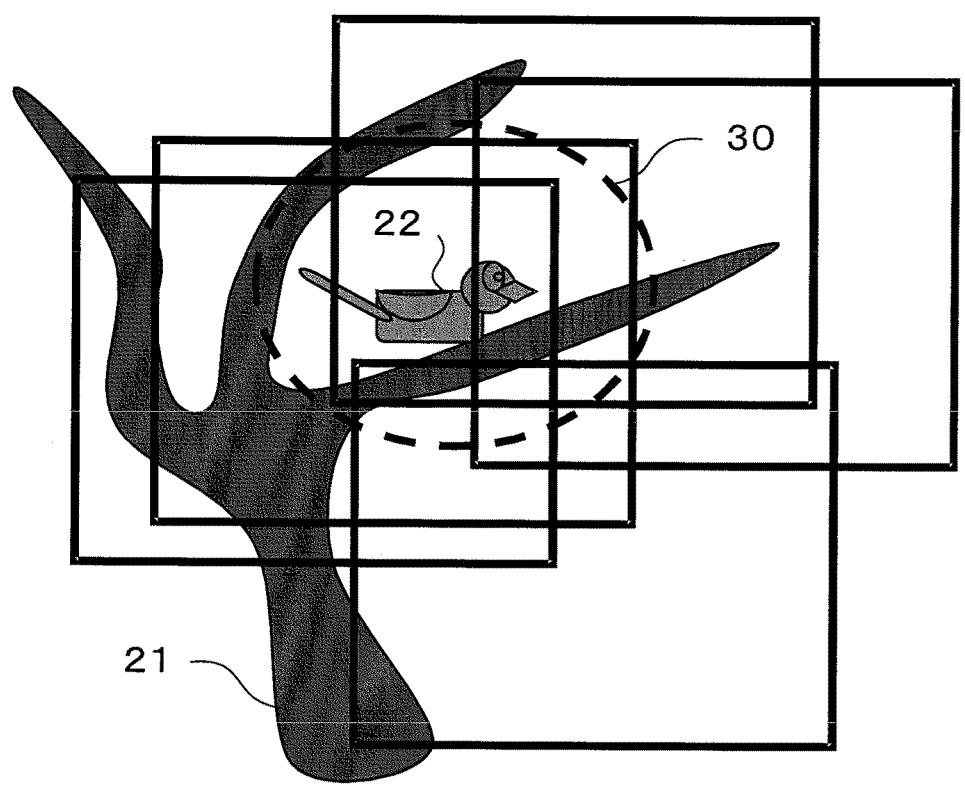
FIG. 11 is a drawing for explaining how partial exposure metering is carried out in order to obtain appropriate exposure for a subject, in a camera of a third embodiment of the present invention.

Next, a third embodiment of the present invention will be described using FIG. 11 and FIG. 12. With the first embodiment a common range was detected with a single two frame comparison, and in the second embodiment a movement vector for an image was detected and the common range detected when this movement vector reversed. With the third embodiment partial exposure metering is carried by selecting the most common portions from images of three or more frames (10 frames in the third embodiment) obtained consecutively. Specifically, as shown in FIG. 11, a common range 30 where numerous viewing ranges overlap most is obtained, and partial exposure metering is carried out for this common range 30.

Figure 12:
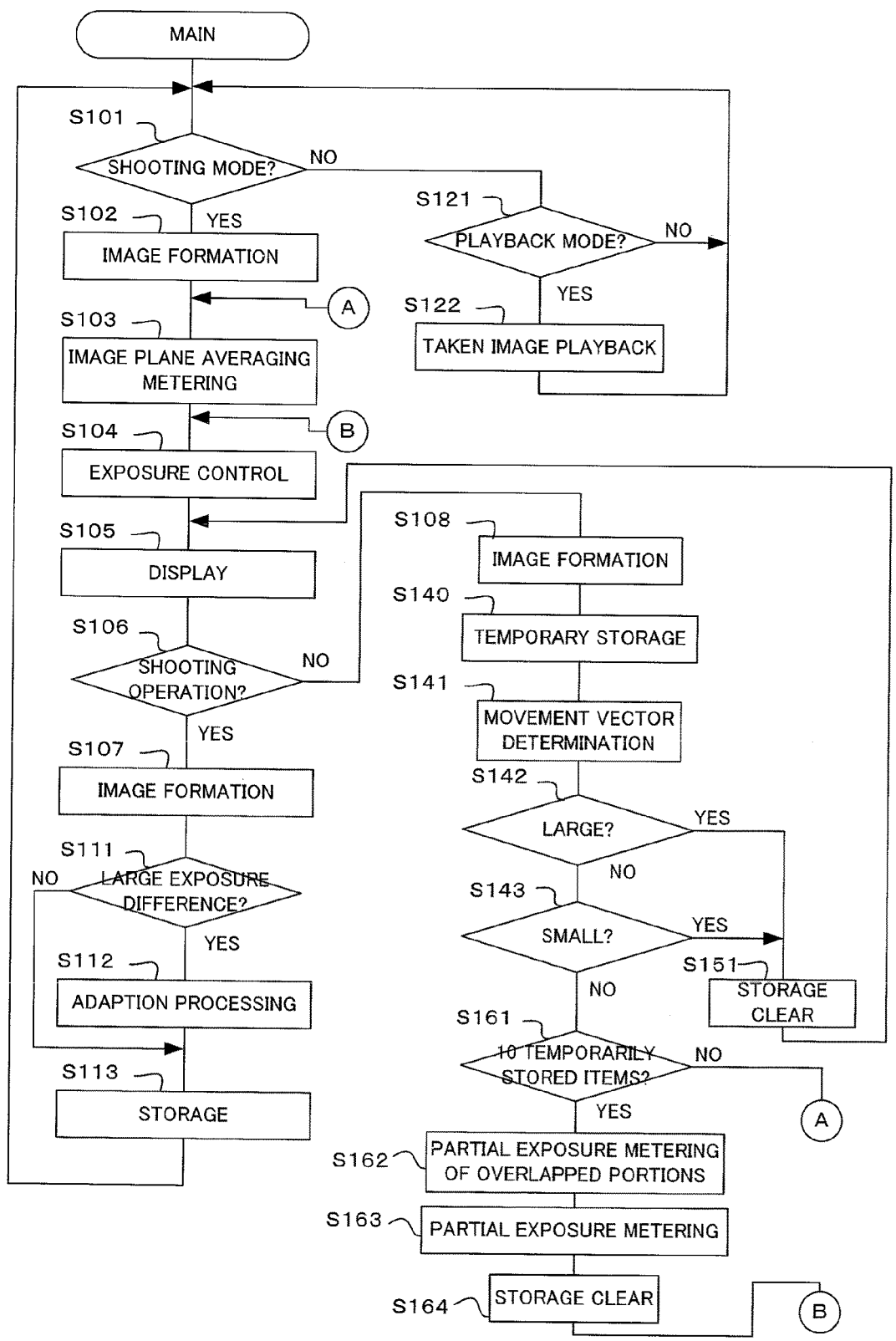
FIG. 12 is a flowchart showing operation of the camera of the third embodiment of the invention.

With the third embodiment, the common range 30 is obtained from portions that overlap the most using the methods as described previously, but this configuration is the same as for the first embodiment and second embodiment, and since the only difference is that the flowchart shown in FIG. 10 is replaced with the flowchart of FIG. 12, description will center on the points of difference.

The processing flow shown in FIG. 12 has step S101 to step S122, and steps S140 to S151, the same as the processing flow shown in FIG. 10, and the same steps have the same reference numerals assigned thereto, and detailed description is omitted. Imaging results are temporarily stored in step S140, but in this embodiment it is possible to temporarily store image data of at least 10 frames.

When the processing flow of FIG. 12 is entered and the result of determination in step S143 is that a movement vector is not smaller than a second specified value, it is next determined whether or not there are 10 frames of temporarily stored images (S161). If the result of this determination is that there are not yet ten frames, processing returns to step S103. After that, imaging is carried out in step S108, and the formed image data are temporarily stored in step S109.

If the result of determination in step S161 is that there are 10 frames of image data temporarily stored, a portion where there is most overlapping is next extracted (S162). Here, as shown in FIG. 11, a common region 30 where there is the most overlapping is obtained from comparison of image data. Once the portion with the most overlapping has been extracted, partial exposure metering is performed (S163). This partial exposure metering is the same as the partial exposure metering that was described in FIG. 7 and FIG. 8 for the first embodiment, and so detailed description is omitted. Once partial exposure metering has been carried out, the image data that was temporarily stored in step S164 is cleared (S164), and processing returns to step S104.

As has been described above, with the third embodiment also movement of the camera 10 is detected based on image data, and partial exposure metering is carried out based on this detected movement of the camera 10. The photographer's intended subject is therefore detected, and it is possible to perform display or exposure of this subject with the appropriate exposure. Also, with the third embodiment partial exposure metering is carried out for a portion with the most overlapping with at least three temporarily stored images, and so it requires a little more processing time, but it is possible to accurately acquire a subject that is to be targeted.

With this embodiment, the motion detection section 5 provides the function of a movement detection section for detecting movement of the imaging device (camera 10). Also, the image processing and control section 1 provides the function of a common range determination section for determining a common range based on detection results from the movement detection section, a display control section for performing control to achieve appropriate display based on image data corresponding to the common range determined by the common range determination section, and an exposure control section for performing control to achieve appropriate exposure based on image data corresponding to the common range determined by the common range determination section. With this embodiment, the function as the movement detection section is fulfilled by the motion detection section 5, but naturally it is also possible to detect movement of the camera 10 based on image data acquired from the imaging section 2, similarly to the first and second embodiments.

Next a fourth embodiment of the present invention will be described using FIG. 13 and FIG. 14A to FIG. 14C. With the first to third embodiments, movement of the camera 10 is detected and a metering method changed, that is, a search mode using motion detection was automatically carried out, but with the fourth embodiment the search mode using motion detection can be set manually. Also, in detecting movement of the camera 10, detection results from the motion detection section 5 are used, not image data.

Figure 13:
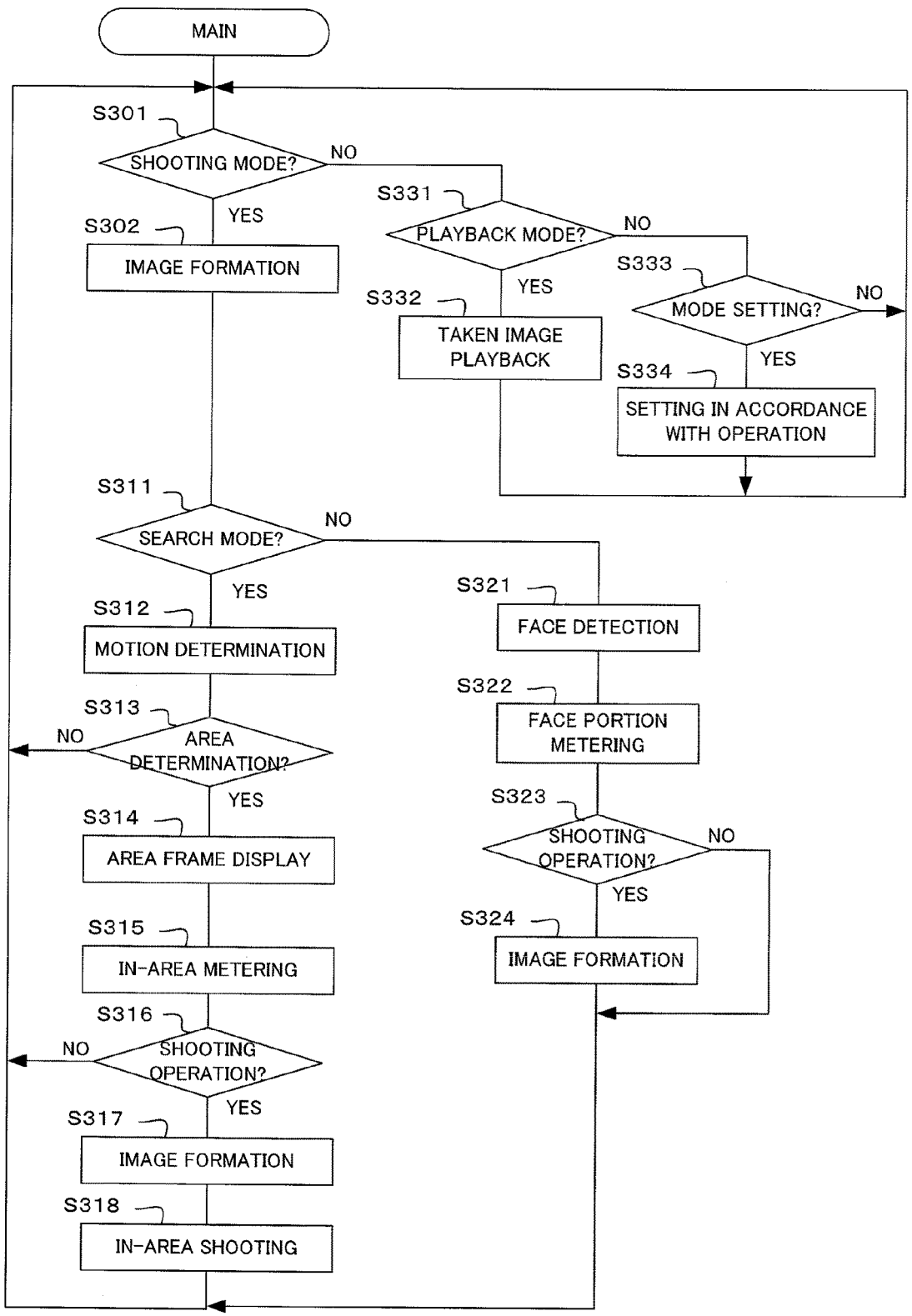
FIG. 13 is a flowchart showing operation of a camera of a fourth embodiment of the present invention.

The structure of the fourth embodiment is the same as the first embodiment shown in FIG. 1, and since the only point of difference is that the flowchart shown in FIG. 5 is replaced with FIG. 13, description will be given focusing on points of difference. If the flow shown in FIG. 13 is entered, then similarly to step S101, it is determined whether or not it is shooting mode (S301). If the result of determination is that the camera is not in shooting mode, it is next determined whether or not it is in playback mode, similarly to step S121 (S331).

If the result of determination in step S331 is that the camera is in playback mode, taken images are next played back, similarly to step S122 (S332). Once playback of taken images is finished, processing returns to step S301. On the other hand, if the result of determination in step S331 is that it is not playback mode, it is next determined whether or not mode setting will be carried out (S333). Since mode setting is carried out using the menu screen etc., in this step whether or not the camera has been set into menu mode is determined by the operation determination section 6.

If the result of determination in step S333 is that it is mode setting, setting is carried out manually in accordance with an operation (S334). Search mode settings for use with motion detection are carried out using this setting mode. Once mode setting has been carried out in step S334, or if the result of determination in step S333 was that it was not mode setting, processing returns to step S301.

If the result of determination in step S301 is shooting mode, image formation is then carried out, similarly to step S102 (S302). Next, it is determined whether or not search mode is active (S311). As described previously, since it is possible to set the search mode in step S334, in this step it is determined whether or not the camera has been set to search mode. As a setting method for the search mode, besides setting manually in step S334 it is also possible to set to search mode in cases such as when the camera 10 is suddenly pointed upwards. Whether or not the camera has suddenly been pointed upwards can be detected using the motion detection section 5.

If the result of determination in step S311 is that search mode has been set, motion determination is carried out (S312). Motion determination is detection of movement of the camera 10 by the motion detection section 5, and determining a common range within this movement if there is a specified amount of movement or more. As with the first to third embodiments, it is also possible to perform motion determination based on image data acquired by the imaging section 2.

Once motion determination has been carried out, area determination is carried out (S313). Here, it is determined, based on results of motion determination carried out in step S312, whether or not there is movement of a specified extent or more, and whether or not there is a common range. If the result of this determination is that there is not a common range, processing returns to step S301. On the other hand, if the result of area determination is that there is a common range, display of an area frame is carried out (S314).

Figure 14A:
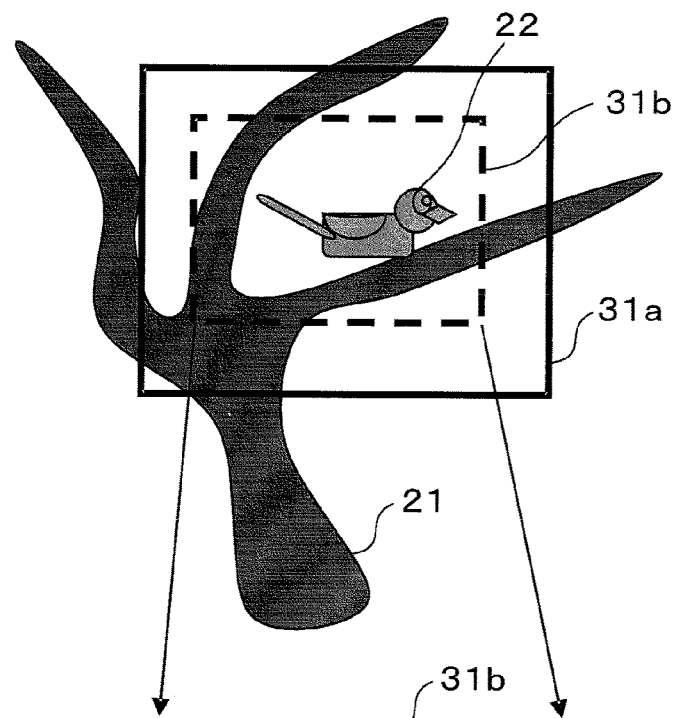
FIG. 14A to 14C are drawings showing the appearance of live view display with the camera of the fourth embodiment of the present invention.
Figure 14B:
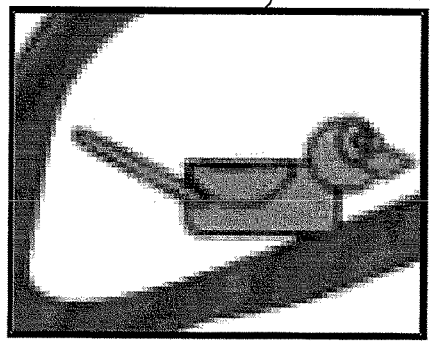
Figure 14C:
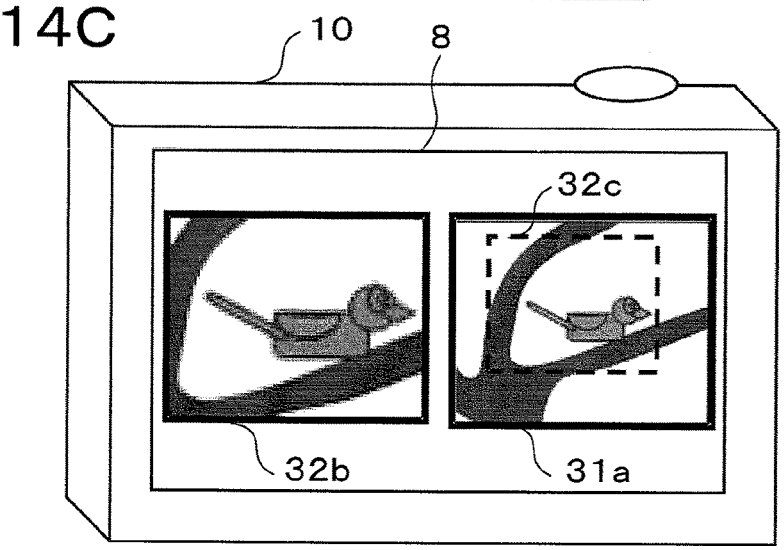

When displaying the area frame in step S314, in the case where there is a common range 31b (refer to FIG. 14B) within the viewing range 31a, as shown in FIG. 14A, then as shown in FIG. 14C both an overall image 32a corresponding to the viewing range 31a, and a search image 32b corresponding to the common range 31b, are displayed on the display section 8. If a region corresponding to the common range 31b (search image 32b) is shown in the overall image 32a using a dotted line frame, the location of the common range 31b is easy to understand.

Once the area frame display of step S314 has been carried out, metering within the area is carried out (S315). Here, metering is carried out, based on image data of the common range 31b, to give appropriate exposure for that range. Based on this area metering, control is carried out to achieve live view display at an appropriate display on the display section 8, and when a shooting operation, which will be described later, is performed exposure control to achieve appropriate exposure is carried out. This metering within the area can use the processing flow for partial exposure metering shown in FIG. 7 as it is.

Once the metering within the area has been carried out in step S315, next, similarly to step S106, it is determined whether or not a shooting operation has been performed. (S316). If the result of this determination is that a shooting operation has not been performed, processing returns to step S301. On the other hand, if a shooting operation has been performed, shooting is carried out (S317). Here, image data corresponding to the entire screen 32a is acquired from the imaging section 2 and stored in the storage section 4.

Next shooting in the area is carried out (S318). Here, image data corresponding to the common range 32b is trimmed from the image data corresponding to the overall image 32a by the image processing and control section 1, and this trimmed image data is stored in the storage section 4. Once shooting in the area has been carried out in step S318, processing returns to step S301.

With this embodiment, image data respectively corresponding to the overall image 32a and the search image 32b are stored in the storage section 4, but this is not limiting, and it is also possible to select and store either one. As a method of selection, it is possible to detect which of the overall image or the search image 32b displayed on the display section has been touched using a touch panel 8b, and to select the image to be stored based on the detection results.

Also, with this embodiment, when there is a common area as a result of the area determination at the time of display, both images are displayed side by side, but it is also possible to selectively display either one of the images. Further, in the first to third embodiments of the present invention also, it is possible to trim the image (search image) of the common range and display as shown in FIG. 14C.

If the result of determination in step S311 is that it is not search mode, it is normal shooting mode and face detection is carried out first (S321). In this step, the image processing and control section 1 processes the image data, and it is determined whether or not a person's face is contained within the image.

Next, face portion metering is carried out (S322). In this step, based on the location of a face that has been detected in step S321, brightness is obtained based on image data around that face. Based on metering results of this face portion metering, control is carried out to achieve appropriate display for live view display on the display section 8, and when a shooting operation, which will be described later, is performed exposure control to achieve appropriate exposure is carried out.

Next, similarly to step S316, it is determined whether or not a shooting operation has been carried out. (S323). If the result of this determination is that a shooting operation has been performed, shooting is carried out (S324). Here, image data acquired by the imaging section 2 is stored in the storage section 4 after image processing by the image processing and control section 1. Once shooting is carried out, if the result of determination in step S324 is that there is no shooting operation, processing returns to step S301.

In this manner, with the fourth embodiment of the present invention movement of the camera 10 is detected by the motion detection section 5, and partial exposure metering is carried out based on this detected movement of the camera 10. The photographer's intended subject is therefore detected, and it is possible to perform display or exposure of this subject with the appropriate exposure.

Also, with the fourth embodiment, since it is possible to manually set a search mode using motion detection, it is possible to carry out shooting as intended by the photographer only when it is desired to execute a search mode. Further, with this embodiment both an overall image 32*a* and a search image 32*b* are displayed on the display section 8. The search image 32*b* is a subject intended as a target by the photographer, and this is subjected to trimmed display and can be shot as it is, and so is extremely convenient.

As has been described above, with each embodiment of the present invention movement of the camera 10 is detected, and display control and exposure control are carried out using image data of portions that are common. The photographer's intended subject is therefore detected with a simple configuration, and it is possible to perform display or exposure of this subject with the appropriate exposure.

With each of the embodiments of the present invention, when carrying out display control and exposure control, partial exposure metering of portions that are common is used, but this is not limiting and it is also possible to perform control using center weighted metering or evaluative exposure metering using the common portions, and to correct display control values and exposure control values using partial exposure metering values.

Also, in each of the embodiments of the present invention, at the time of live view display exposure and color correction are carried out, but since the purpose of this is to improve the visual quality in a liquid crystal panel or an organic EL panel display system, these adjustments are not limiting and it is also possible, for example, to implement schemes such as increasing backlight brightness or flash brightness in accordance with exposure and color correction.

Further, with each of the embodiments of the present invention, description has been given using a using a digital camera as an apparatus for taking pictures, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc.

The present invention is not limited to the above described embodiments, and structural elements may be modified in actual implementation within the scope of the gist of the embodiments. It is also possible to form various inventions by suitably combining the plurality structural elements disclosed in the above describe embodiments. For example, it is possible to omit some of the structural elements shown in the embodiments. It is also possible to suitably combine structural elements from different embodiments.

What is claimed is:

1. An imaging device, comprising:
   an imaging section for forming a subject image and outputting image data;
   a metering range determination section for determining movement of the imaging device, when a photographer searches for a subject and changes a metering range, based on the image data, and determining a metering range based on the results of this movement determination so as to change the metering range from a wide region to a narrow region;
   an image processing section for subjecting image data to processing to achieve appropriate display based on image data of a metering range determined by the metering range determination section; and
   a display section for displaying the subject image based on the image data that has been processed by the image processing section.

2. The imaging device of claim 1, wherein:
   the metering range determination section compares the image data at a first time and the image data at a second time, and determines spatially identical portions to be a metering region.

3. The imaging device of claim 1, wherein:
   the metering range determination section obtains a movement vector based on the image data, and determines the metering range in the vicinity of where the movement vector reverses.

4. The imaging device of claim 1, wherein:
   the metering range determination section temporarily stores a plurality of image data, and when the temporarily stored image data reach a specified number, determines portions that overlap the most to be the metering range.

5. The imaging device of claim 1, wherein:
   the image processing section carries out image processing for chroma emphasis on image data of the metering range.

6. The imaging device of claim 1, wherein the metering range determination section determines a common range of a viewing range that varies in accordance with movement of the imaging device, as a metering range.

7. The imaging device of claim 1, wherein the metering range determination section switches from a metering range for average metering to a metering range for partial metering.

8. The imaging device of claim 1, wherein the metering range determination section sets a range of a subject intended by the photographer.

9. The imaging device of claim 1, wherein the narrow region is a common range where the field of view ranges of a plurality of images at a plurality of times overlap.

10. A non-transitory processor readable medium storing processor executable instructions which, when executed by at least one processor, cause the at least one processor to perform an imaging method comprising:
    receiving image data of a subject image output by an imaging device;
    determining movement of the imaging device, when a photographer searches for a subject and changes a metering range, based on the image data;
    determining, using a metering range determination section of the imaging device, a metering range based on the determined movement of the imaging device, so as to change the metering range from a wide region to a narrow region;

subjecting image data to processing to achieve appropriate display based on image data of a metering range determined by the metering range determination section; and displaying the subject image based on the image data that has been processed.

11. An imaging method comprising:

forming a subject image and outputting image data using an imaging device;

determining movement of the imaging device, when a photographer searches for a subject and changes a metering range, based on the image data;

determining, using a metering range determination section of the imaging device, a metering range based on the determined movement of the imaging device, so as to change the metering range from a wide region to a narrow region;

subjecting image data to processing to achieve appropriate display based on image data of a metering range determined by the metering range determination section; and displaying the subject image based on the image data that has been processed.

12. The method of claim 11, further comprising:

comparing the image data at a first time and the image data at a second time; and determining spatially identical portions to be a metering region.

13. The method of claim 11, further comprising:

obtaining, with the metering range determination section, a movement vector based on the image data; and determining, with the metering range determination section, the metering range in a vicinity of where the movement vector reverses.

14. The method of claim 11, further comprising:

temporarily storing, with the metering range determination section, a plurality of image data; and determining portions that overlap the most to be the metering range responsive to a determination that the temporarily stored image data reached a specified number.

15. The method of claim 11, further comprising:

carrying out image processing for chroma emphasis on image data of the metering range.

16. The method of claim 11, further comprising:

determining, by the metering range determination section, a common range of a viewing range that varies in accordance with movement of the imaging device, as a metering range.

17. The method of claim 11, further comprising:

switching, by the metering range determination section, from a metering range for average metering to a metering range for partial metering.

18. The method of claim 11, further comprising:

setting, by the metering range determination section, a range of a subject intended by the photographer.

19. The method of claim 11, wherein the narrow region is a common range where the field of view ranges of a plurality of images at a plurality of times overlap.

* * * * *